3,359,295
POLYISOCYANATE COMPOSITIONS AND PROCESSES FOR THE PRODUCTION THEREOF
Andrew Shultz, Amherst, and Melvin Kaplan, Tonawanda, N.Y., assignors to Allied Chemical Corporation, New York, N.Y., a corporation of New York
No Drawing. Filed Feb. 7, 1964, Ser. No. 343,218
5 Claims. (Cl. 260—453)

ABSTRACT OF THE DISCLOSURE

Production of polyisocyanate compositions obtained by phosgenation of toluene diamines in the presence of a solvent, comprising incorporating in the toluene diamine phosgenation product a polyhydroxy organic compound containing 3-8 inclusive hydroxyl groups in an amount of about 0.5% to about 4% by weight of the toluene diamine phosgenation product and thereafter distilling said mixture to remove volatile constituents until the resultant distilland has a viscosity of from 20 to 10,00 cps. at 25° C. and an amine equivalent within the range of 100-130. The polyisocyanate compositions are useful as intermediates in the preparation of "one-shot" cellular urethanes.

---

This invention relates to novel polyisocyanate compositions. More particularly it relates to undistilled diisocyanate compositions having a viscosity within the range of 20 and 10,000 cps. at 25° C. and an amine equivalent within the range of 100 and 130. It concerns especially such compositions wherein the diisocyanate component is tolylene diisocyanate.

Diisocyanates, and especially toluene diisocyanates, are important industrial products useful in the manufacture of urethane polymers. They are produced commercially by phosgenation of diamines or mixtures thereof in the presence of a solvent and thereafter the phosgenation mixture is distilled to recover solvent and the diisocyanates or mixtures thereof. For example, a mixture of 2,4- and 2,6-toluene diamines, prepared by dinitration of toluene and reduction of the resultant mixture of dinitrotoluenes, is phosgenated in the presence of a chlorinated benzene solvent and the solvent solution of the phosgenation product is fractionally distilled to recover solvent and tolylene diisocyanates, usually a mixture comprising about 80% of the 2,4- and about 20% of the 2,6-tolylene diisocyanates. During the phosgenation and subsequent distillation both of which steps involve subjecting the highly reactive diisocyanate composition to elevated temperature, polymerization and decomposition of the desired diisocyanate products unavoidably occur, resulting in substantial losses of valuable products.

It has been proposed to avoid, in part at least, such losses of valuable material by eliminating, in part or entirely, the distillation of the phosgenation mixture after removal of the solvent. Indeed, it has been fortuitously discovered that the essentially solvent-free undistilled phosgenation product obtainable under certain reaction conditions has valuable advantages over the distilled diisocyanate product; notably this product can be reacted with polyfunctional polyols to produce cellular urethanes by the "one-shot" procedure. Heretofore such urethanes prepared by the "one-shot" procedure utilizing distilled diisocyanates were unsatisfactory as to dimensional stability and other properties. The elimination or substantial reduction of the costly and time consuming fractional distillation step from the synthesis of such undistilled diisocyanate products represents a distinct economic advance in this art wherein the utilization of the undistilled phosgenation products has been a valuable contribution to the technology of the preparation of urethane polymers.

We have observed, however, that the undistilled isocyanate residue after removal of the solvent fraction is generally unsatisfactory in at least two important aspects. For one, the viscosity is often below 20 cps. (measured at 25° C.) which is less than that desired in order to provide adequate compatability with the other components of the polymerizable mixture. Also the content of polyfunctional components, which is deduced from the amine equivalent of the composition, is usually below that considered necessary to provide a sufficient number of cross-linking sites and hence to assure adequate stability and rigidity of the cellular urethanes obtainable from the diisocyanate product.

It has been proposed to overcome these major deficiencies in the solvent-free undistilled phosgenation products by continuing the distillation of the solvent-free phosgenation product until the content of polyfunctional isocyanates, as measured by the amine equivalent of the residue, has increased to within a desired predetermined range. Concomitantly, the viscosity of the distilland increases also. In this way, the crude phosgenation product can be processed by removal of diisocyanate material to obtain an undistilled phosgenation product having a viscosity and amine equivalent ("content of polyfunctional material") within predetermined values and such a product is useful for the preparation of rigid cellular urethanes by the "one-shot" procedure which cellular products have excellent dimensional stability.

This proposed procedure has disadvantages also. The adjustment of the viscosity and content of polyfunctional material often requires the removal by distillation of considerable amounts, up to 50% or more, of the diisocyanate material. This in effect reduces the effective capacity of the equipment to produce the undistilled phosgenation product which may be more desirable to produce than tolyene diisocyanate depending on market conditions, and also reduces the yield of such product. The adjustment step is accomplished by vacuum fractional distillation which is a relatively expensive procedure to install and operate and hence increases the cost of the desired product.

It is, therefore, a principal object to provide novel compositions of substantially solvent-free undistilled toluene diamine phosgenation products comprising essentially diisocyanates which are suitable for the production of rigid cellular urethanes.

Another object is to provide novel compositions of substantially solvent-free undistilled toluene diamine phosgenation products comprising essentially diisocyanates which compositions have a viscosity within the range of 20 to 10,000 cps. at 25° C. and an amine equivalent within the range of 100 to 130.

A particular object of this invention is to provide novel compositions of solvent-free undistilled toluene diamine phosgenation products having a viscosity within the range of 35 to 150 and an amine equivalent within the range of 102 to 112.

Still another object is to devise a process for preparing substantially solvent-free undistilled toluene diamine phosgenation products comprising essentially toluene diisocyanates.

These and other objects will be obvious from the following description of our invention.

We have made the surprising discovery that the viscosity and polyfunctional isocyanate content of undistilled phosgenation product of toluene diamine can be adjusted to within desirable ranges by the addition thereto, either before or after removal of solvent of a small amount, generally less than about 4% by weight of the phosgenation reaction product, of a polyol having a functionality of at least three but no more than eight, preferably from 3 to 6, and thereafter removal of solvent, if present, and continuing distillation of the mixture to remove a portion of the toluene diisocyanate to attain a viscosity, amine equivalent and content of polyfunctional components within the desired range.

This new process makes possible the preparation of novel undistilled toluene diamine phosgenation products comprising essentially diisocyanates, which are equivalent in function as components of "one-shot," rigid cellular urethanes to the aforesaid known compositions, in a more convenient and more economical manner. Moreover by substantially reducing the amount of diisocyanate which must be distilled from toluene diamine phosgenation product in order to obtain the desired viscosity and content of polyfunctional isocyanate components the yield of desired composition is proportionately substantially increased.

The undistilled phosgenation product of this invention is derived from toluene diamine and especially from a mixture of about 80% 2,4- and about 20% 2,6-toluene diamines.

The undistilled toluene diamine phosgenation mixture is reacted with a polyol in order to produce the novel compositions of this invention. The polyol can be a hydroxyl containing polyester such as the reaction product of trimethylol propane with a mixture of adipic and phthalic acids, having a hydroxyl number of about 470 and an acid number below 10; or a polyether such as a sorbitol-propylene oxide reaction product having a hydroxyl number of about 490. The polyol can have from 3 to 8 reactive hydroxyl groups and preferably this number is from 3 to 6 such groups. Typical of suitable polyols of these classes are the following:

Triols:
    glycerine
    propoxylated glycerine
    trimethylolpropane
Tetrols:
    pentaerythritol-propoxylated
    pentaerythritol-ethoxylated
    pentaerythritol-propoxylated-ethoxylated
Pentol: methyl glucoside-propoxylated
Hexol: sorbitol-propoxylated
Octol: sucrose-propoxylated Mixtures of these and equivalent polyols are contemplated for this purpose also.

The amount of polyol used can vary over a considerable range and will depend to a major extent upon the desired qualifications, i.e. viscosity and content of polyfunctional components, of the undistilled solvent-free toluene diamine phosgenation product composition. In most instances, these qualifications are determined by the use to which the composition is to be put. For example, an undistilled solvent free phosgenation product comprising essentially toluene diisocyanates which is to be used for the production of rigid foams by the "one-shot" procedure should have a viscosity within the range of 35 to 150 cps. at 25° C. and a content of polyfunctional isocyanate components within the range of about 20% to about 35% (corresponding to an amine equivalent within the range of about 102 to about 130). Such a composition can be obtained by the addition of a relatively small amount of a polyol described above, generally less than about 4% by weight of the phosgenation mixture (not including solvent), preferably after substantially completely removing the solvent and heating the resultant mixture at a moderate temperature, e.g., 60° to 70° C. for a short period sufficient to insure complete reaction of the polyol with the isocyanate component. Thereafter, the low boiling constituents ("lites cut"), usually amounting to about 2 to 5% of the mixture, are removed by distillation and the residual mass is checked to insure that the viscosity and amine equivalent are within the desired range. At this stage it is preferred to make any further adjustments in amine equivalent and/or viscosity by distillation of toluene diisocyanate, which adjustment is usually accomplished by distillation of relatively small amounts, less than about 30%, of the mixture (by weight).

The amount of polyol used varies also according to the functionality of the polyol. That is to say, the greater the functionality of the polyol the less of this component is required to provide the desired increase in polyfunctional components, or expressed mathematically, $$\frac{\text{mw. of polyol}}{\text{functionality}} = \text{equivalent weight}$$

Hence the greater the functionality, per unit molecular weight, of the polyol, the less of this component is required to provide the desired increment in polyfunctional component and amine equivalent. In general an amount of about 0.5% to about 4% polyol by weight of the phosgenation mixture give satisfactory results and amounts substantially in excess of 4% or below 0.5% should be avoided.

The content of polyfunctional isocyanate components varies directly with the amine equivalent of the composition and hence the amine equivalent may be taken as a measurement of the content of polyfunctional isocyanate components. The latter also can be estimated by means of the infrared absorption of the composition at 5.85 microns. Inasmuch as toluene diisocyanate in the pure state, does not absorb in this region of the infrared, the absorbance of the novel composition of this invention can be used to estimate the content therein of polyfunctional components.

The amine equivalent of isocyanate containing compositions is measured by a well known analytical procedure and is a measure of isocyanate equivalent weight. This procedure involves reacting a measured sample of the isocyanate composition with an excess of n-butyl amine and back titrating the excess of n-butyl amine with standard hydrochloric acid. The result, "amine equivalent," is the weight of the isocyanate composition containing 1 equivalent weight (42 grams) of NCO-group.

The term "undistilled phosgenation product" as used herein is intended to designate the reaction product of toluene diamine, or mixture of such diamines, with phosgene, which product may or may not contain a solvent and from which reaction product none or a portion of the organic diisocyanate corresponding to the organic diamine has been removed by distillation.

The following examples will illustrate the present invention. Parts and percentages are by weight and temperatures are given in degrees centigrade.

*Example I*

(A) To 1350 parts of solvent-free undistilled phosgenation product derived from a mixture of about 80% 2,4- and about 20% 2,6-toluene diamines, 23.8 parts of a sorbitol-propylene oxide reaction product having a hydroxyl number of 490 (a hexol, available commercially as Atlas Polyol G-2410) are added dropwise at 65° to 75° in about ½ hour. The mixture is agitated for ½ hour at 70° to 75° and thereafter the mass is distilled to remove as a "lites cut," 71 parts of a fraction distilling at 114° to 134°/45 to 70 mm. Hg. The distillation is continued to remove toluene diisocyanate at 102°–108°/2.5–3.5 mm. Hg. A total of 383 parts of toluene diisocyanate is removed from the mixture. The distilland is cooled to ambient temperature.

(B) For comparison, 2216 parts of the same lot of solvent-free undistilled phosgenation product used in the above procedure is processed by merely distilling off tolylene diisocyanates until a distilland of comparable amine equivalent is obtained. Table I below contains data concerning the two resultant products.

TABLE I

|  | Original Material | Product of Ex. 1A | Product of Ex. 1B |
|---|---|---|---|
| Charge | | 1,350 | 2,216 |
| "Lites" | | 71 | 111 |
| Percent of Charge | | 5.25 | 5 |
| TDI Distilled | | 383 | 885 |
| Percent of Charge | | 28.3 | 40 |
| Yield (Distilland) | | 922 | 1,222 |
| Percent | | 75 | 55 |
| Amine Equivalent | 98 | 105 | 109 |
| Viscosity at 26° | 20 | 116 | 42 |
| Percent Polyfunctional Components | 14 | 26 | 22 |

These data indicate the improvements in yield viscosity, and polyfunctionality obtained by the new procedure as compared with a typical old and more expensive distillation procedure.

*Example II*

The toluene diisocyanate products prepared in the above example can be used to prepare rigid cellular urethane polymers by a "one-shot" procedure, as follows:

A premix is prepared by mixing the following components 160 parts of polyether triol ("Niax Triol LK-380," having a hydroxyl number of 375-380, an acid number less than 1 and a water content of less than 1%)
15 parts of tetra(hydroxypropyl)ethylene diamine ("Quadrol")
1.5 parts of a silicone emulsifier ("Silicon L-520")
1.2 parts of dibutyltin dilaurate ("Catalyst D-22")
57 parts of trichloromonofluoromethane ("Genetron 11")

The isocyanate composition prepared as in Example 1 is added to the premix in the proportion of 96.5 parts per 164 parts of the premix, at 20°. The mixture is agitated for about 35 seconds, allowed to expand to maximum volume and then to stand at ambient temperature for about 16 hours. The resultant cellular products have the characteristics set out in Table II.

TABLE II

| Property | Foam from Isocyanate Ex. 1A | Composition of Ex. 1B |
|---|---|---|
| Density, lbs./ft.³ | 1.7 | 1.7 |
| Porosity, Percent Open Cells | 5.3 | 7.5 |
| Friability | Nil | (¹) |
| Compression Load: | | |
| At yield, p.s.i. | 25 | 24 |
| At 10%, p.s.i. | 29 | 29 |
| Dimensional Stability, Percent Volume Change: | | |
| 24 hrs. at 70° | (²) | 1.2 |
| 24 hrs. at 110° | 7.1 | 13.8 |
| 24 hrs. at −30° | −0.5 | −1.7 |
| Humid Cabinet: | | |
| 24 hrs. at 70° | 4 | 8 |
| 3 Days at 38° | (²) | 0.4 |

¹ Slight to appreciable.
² No change.

As will be noted in Table II except for a slight but noticeable improvement in friability and dimensional stability evidenced by the foam prepared from the product of Example 1A, these cellular products are equivalent in their properties and are typical of the excellent products obtainable by the "one-shot" procedure from undistilled phosgenation mixtures derived from toluene diamine.

*Example III*

The procedure of Example 1A above is repeated using a like amount of a solvent-free undistilled phosgenation product derived from toluene diamine and having a viscosity of 16 cps. at 26°, an amine equivalent of 108.9 and a polyfunctional component content of about 16% (continuous process stripped crude) but only 11.9 parts, instead of 23.8 parts, of Atlas Polyol G2410. The undistilled phosgenation composition, after removal of 72 parts of "lites" and 430 parts of toluene diisocyanates by distillation, amounts to 823 parts (61%) and has a viscosity of 52 cps. and an amine equivalent of 110.6. The polyfunctional isocyanate components estimated from the percent absorbance at 5.85 microns is 33.3%.

It can thus be seen that an effective and economical method has been provided to prepare undistilled phosgenation compositions derived from organic diamines and that the novel compositions are highly suitable for the production of rigid cellular urethanes by the "one-shot" technique.

Although certain preferred embodiments of the invention have been disclosed and illustrated in the examples it will be evident that various changes and modifications in these details may be made without departing from the scope or spirit of our invention.

We claim:

1. In a process for the production of polyisocyanate compositions by phosgenation of toluene diamines in the presence of a solvent, to produce a toluene diamine phosgenation product, the improvement of incorporating in the toluene diamine phosgenation product a polyol containing 3-8 inclusive hydroxyl groups in an amount of about 0.5% to about 4% by weight of the toluene diamine phosgenation product and thereafter distilling said mixture to remove volatile constituents until the resultant distilland has a viscosity of from 20 to 10,000 cps. at 25° C. and an amine equivalent within the range of 100-130.

2. In a process for the production of polyisocyanate compositions by phosgenation of toluene diamines in the presence of a solvent, to produce a toluene diamine phosgenation product, the improvement of incorporating in the toluene diamine phosgenation product a polyol containing 3-8 inclusive hydroxyl groups in an amount of about 0.5% to about 4% by weight of the toluene diamine phosgenation product and thereafter distilling said mixture to remove volatile constituents until the resultant distilland has a viscosity of from 30 to 150 cps. at 25° C. and an amine equivalent within the range of 102-112.

3. A process as claimed in claim 1 wherein the solvent is removed from the toluene diamine phosgenation product prior to incorporation of the polyol.

4. A polyisocyanate composition comprising a substantially solvent-free toluene diamine phosgenation product having incorporated a polyol containing 3-8 inclusive hydroxyl groups in an amount of about 0.5% to about 4% by weight of the toluene diamine phosgenation product, said mixture having a viscosity of from 20 to 10,000 cps. at 25° C. and an amine equivalent within the range of 100-130.

5. A polyisocyanate composition comprising a substantially solvent-free toluene diamine phosgenation product having incorporated a polyol containing 3-8 inclusive hydroxyl groups in an amount of about 0.5% to about 4% by weight of the toluene diamine phosgenation product, said mixture having a viscosity of from 30 to 150 cps. at 25° C. and an amine equivalent within the range of 102-112.

References Cited

UNITED STATES PATENTS

| 3,012,008 | 12/1961 | Lister | 260—75 |
| 3,020,249 | 2/1962 | Curtis | 260—2.5 |
| 3,076,770 | 2/1963 | Saunders et al. | 260—2.5 |
| 3,215,652 | 11/1965 | Kaplan | 260—2.5 |

CHARLES B. PARKER, *Primary Examiner.*

D. H. TORRENCE, *Assistant Examiner.*